United States Patent

Antonini et al.

[11] Patent Number: 4,844,484
[45] Date of Patent: Jul. 4, 1989

[54] FLOATING LIP SEAL WITH REINFORCED FLEXIBLE PORTION

[75] Inventors: Joseph Antonini, Chicago; Paul Gallo, Berwyn, both of Ill.

[73] Assignee: Dana Corporation, Toledo, Ohio

[21] Appl. No.: 212,559

[22] Filed: Jun. 28, 1988

[51] Int. Cl.$^4$ ............................................. F16J 15/32
[52] U.S. Cl. ................................... 277/153; 277/166
[58] Field of Search .............. 277/152, 153, 157, 88, 277/89, 90, 179, 180, 35, 50, 165, 53, 56, 166, 134, 164, 235 R, 227

[56] References Cited

U.S. PATENT DOCUMENTS

| | | | |
|---|---|---|---|
| 2,525,365 | 10/1950 | Meyer | 277/89 |
| 2,731,284 | 1/1956 | Chambers, Jr. et al. | 277/179 |
| 2,736,586 | 2/1956 | Riesing | 277/179 |
| 3,362,919 | 1/1968 | McCormick | 277/153 |
| 4,015,883 | 4/1977 | Taylor | 277/153 |
| 4,274,641 | 6/1981 | Cather, Jr. | 277/153 |
| 4,360,208 | 11/1982 | Hill et al. | 277/153 |
| 4,426,094 | 1/1984 | Antonini | 277/153 |
| 4,588,195 | 5/1986 | Antonini et al. | 277/153 |

*Primary Examiner*—William A. Cuchlinski, Jr.
*Assistant Examiner*—Jeff Hohenshell
*Attorney, Agent, or Firm*—F. B. McDonald

[57] ABSTRACT

An annular shaft seal including a continuous lip sealing element for sealing against oil flow between a bore and a shaft extending through the bore includes a convoluted elastomeric flexible section which connects the sealing element with a rigid case support. The flexible section is defined by a plurality of annuli, wherein each adjoining pair of annuli defines a reverse bend therebetween. One or more of the reverse bends is reinforced with a relatively non-elastic material, preferably plastic, which is integrally molded thereinto, and provides a torsional rigidity while permitting radial flexibility. This provides a closer following of the lip seal element on the shaft under conditions of extreme runout wherein the lip seal element would otherwise become dynamically distorted.

12 Claims, 1 Drawing Sheet

FLOATING LIP SEAL WITH REINFORCED FLEXIBLE PORTION

BACKGROUND OF THE INVENTION

This invention relates to shaft seals, and more particularly to structures for accommodating radial shaft movements associated with runout and mis-alignment eccentricities.

Numerous prior art sealing designs are provided for conditions of high shaft runout and mis-alignment in environments such as crankcase housing bores having shafts extending therefrom. When severe, such conditions cause premature failures of typical sealing systems. Many designs include flexible sections which connect lip type sealing elements with rigid case supports normally affixed to the housing bores. The flexible sections provide a floating capability with respect to the sealing lip for permitting radial movement of a shaft relative to the rigid case support without severe leakage, particularly where extreme eccentricities allow for high shaft runouts over substantial periods of time.

Most of these systems, however, lack stability under extreme runout conditions, wherein, notwithstanding the flexibility of the connective member between the rigid case support and the lip sealing element, there is a need to control or at least curtail some of the dynamic movement associated with the flexible portion. Such control of dynamic seal lip movement would enhance lip contact with the shaft.

SUMMARY OF THE INVENTION

The improved lip seal assembly of the present invention incorporates a convoluted flexible section which provides a radial float capability sufficient to hold and maintain the primary sealing lip in contact with the shaft under eccentricities in excess of 0.060 inches.

In addition, the present invention provides a means for protecting the primary sealing lip via the use of a dirt lip angled away from the oil side of the seal. In one preferred form, the invention also provides a bearing member comprising a low friction cylindrical body which closely engages the shaft at all times, preferably formed of polytetrafluoroethylene. The latter bearing member is preferably positioned intermediately of the primary sealing lip and the dirt lip, whereby the dirt lip may protect both the bearing surface-shaft interface as well as the primary lip-shaft interface.

The present invention provides a rigidity reinforcement in the flexible portion, the flexible portion defining a convoluted cross section having a plurality of annuli adjoined by reverse bends. One of the reverse bends includes an integrally molded annulus formed of a less elastic material than that of the annuli, such as a plastic. In the same preferred form, the reinforcement annulus has a circular cross section.

Also in the present invention, each successive reverse bend away from the case support has a thickness less than that of the next adjacent reverse bend. This provides for a generally more optimal flexibility pattern than if the reverse bends have equal or uniform thicknesses. The seal assembly of the present invention will therefore accommodate a substantial amount of eccentricity, while avoiding the typical sealing lip distortion on the "high" side of the shaft with concurrent loss of sealing contact on the opposite or "low" side.

DETAILED DESCRIPTION OF PREFERRED EMBODIMENTS

Figure 1:
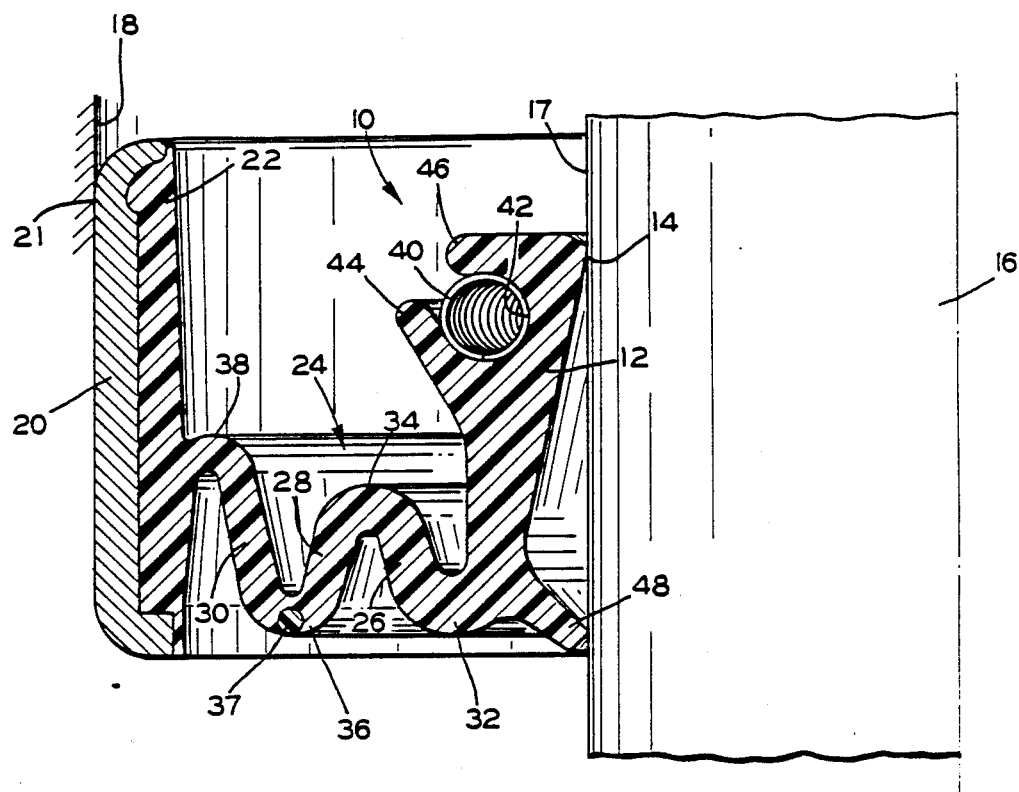
FIG. 1 is a fragmentary half-cross section view of a floating lip seal of the present invention having a reinforced flexible portion.

Making reference initially to FIG. 1, a floating lip seal assembly 10 includes an elastomeric annular primary body portion 12 which contains a primary sealing lip 14. The lip 14 is adapted for continuous contact with a shaft 16, and circumferentially engages the outside diameter (O.D.) 17 of the shaft, as shown. The lip seal assembly 10 is disposed for insertion into a bore 18, such as that of an automotive crankcase (not shown), by means of a rigid case shell 20 to which the elastomeric body of the assembly 10 is molded. In the preferred form, the rigid case shell 20 is of a metallic material. For purposes of frictional securement of the assembly 10 within the bore 18, the outside diameter 21 of the case shell 20 is sized so as to provide an interference fit with the bore 18.

An elastomer inner shell 22 is integrally molded directly to the shell 20, and the primary body portion 12 is an integral part of the shell 22, being connected to the inner shell 22 via a flexible portion 24.

The portion 24, to which this invention particularly relates, is formed of a plurality of integrally formed annuli of the same elastomer material as that of the inner shell 22 and the primary body portion 12. In the preferred embodiment in FIG. 1, there are three annuli: a first annulus 26, a second annulus 28, and a third annulus 30. The annuli are all connected by a plurality of reverse bends; a first reverse bend 32 integrally connects the primary body portion 12 with the first annulus 26. The second reverse bend 34 connects the first and second annulus 26 and 28 respectively. The third reverse bend 36 connect the second and third annuli 28 and 30. Finally, a partial reverse bend 38 connects the third annulus 30 with the elastomer inner shell 22.

In the preferred form, the various reverse bends become successively smaller in radial thickness as their distances from the primary body portion 12 become greater. Thus, the partial reverse bend 38 is smaller in thickness than the third reverse bend 36. Similarly, the third reverse bend 36 has a thickness less than that of the second reverse bend 34. Finally, the second reverse bend has a thickness less than that of the first reverse bend 32. In the preferred form, each successive reverse bend may have a thickness approaching 60–75 percent of that of each adjacent reverse bend closer to the primary body portion 12. This relationship has been found to provide a more optimal dynamic movement of the flexible body portion during high frequency vibrations under conditions under which total eccentricities approach one hundred thousandths of an inch.

An additional feature provided by the present invention relates to the relative angular flexibility of each reverse bend as related to the particular pair of annuli associated therewith. Thus, for example, the reverse bend 36 will have a certain amount of annular flexibility which will affect the torsional movements of second and third annuli 28 and 30 with respect to each other about the reverse bend 36. Thus the annulur stiffness of the reverse bend will affect the initial dynamic properties of the latter pair of annuli, and hence the overall performance of the lip seal-shaft interface under conditions of extreme eccentricity or shaft runout.

For this purpose, a reinforcement ring 37 is formed of a preferably high temperature plastic material molded into the elastomeric flexible portion 24 as shown at the time of manufacture of the assembly 10. Although the preferred embodiment shown in FIG. 1 incorporates the reinforcement ring 37 at the third reverse bend 36, this invention is not limited to such placement of the reinforcement ring, but envisions potential placement of the ring or rings at other reverse bend locations for desired dynamic control of the primary sealing lip 14 on the O.D. 17. In addition, this invention contemplates that the reinforcement ring 37, which imparts torsional rigidity to the particular bend of its location, may be formed of other materials besides plastic, such as, for example, steel or certain other materials suitable for reinforcing stiffness of elastomers. Also, the preferred cross-sectional diameter of the ring 37 is in the range of 25 to 50 percent of the reverse bend thickness.

As will be apparent in FIG. 1, the primary sealing lip 14 is placed under a slight static compression load against the shaft 16 by provision of a garter spring 40 as is conventional in the art. The garter spring 40 is retained within a groove 42 having annular projections 44 and 46 which engage the majority of the cross section of the garter spring as shown. In addition, and as earlier indicated, the first preferred embodiment of FIG. 1 includes a dirt lip 48 for protecting the life of the primary sealing lip. In the preferred form, the lip 48 is angled away from the primary sealing lip, as shown. Finally, the primary sealing lip may include a helical rib to enhance the oil leakage control capabilities of the lip 14.

Figure 2:
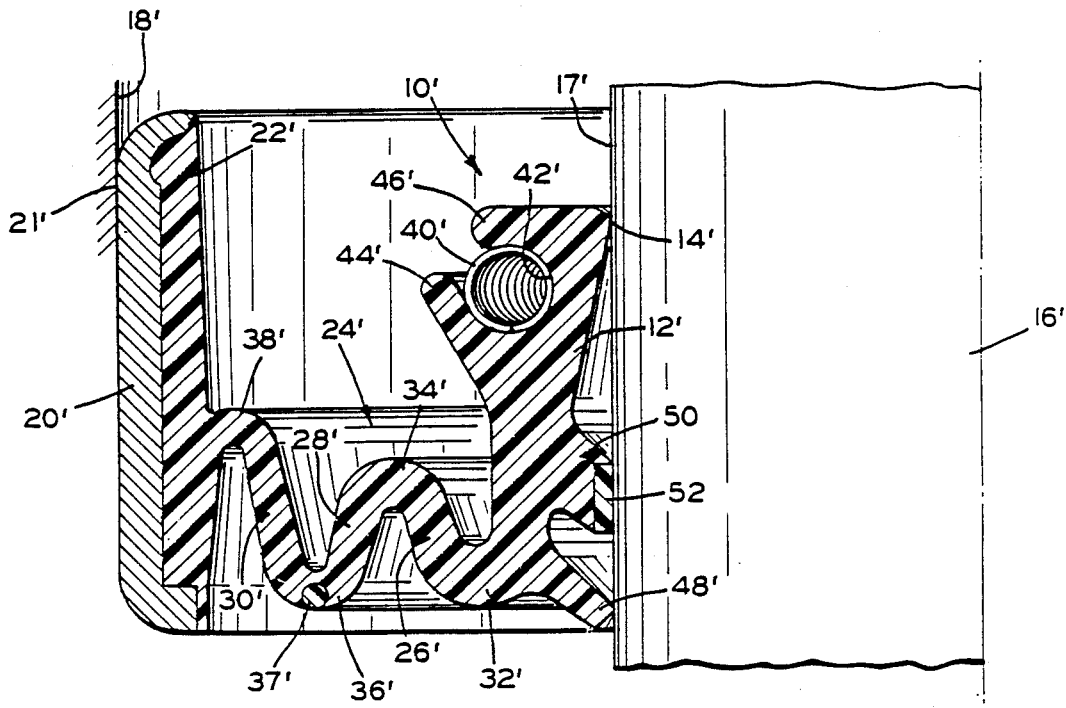
FIG. 2 is a similar view of an alternative embodiment.

Referring now to FIG. 2, an alternative embodiment of the lip seal assembly 10' is shown, which is similar in most respects to the assembly 10 of FIG. 1. The alternative embodiment of FIG. 2, however, includes a cylindrical bearing member 50 interposed between the primary sealing lip 14' and the dirt lip 48'. The latter bearing member provides a means of enhancing the ability of the sealing lip 14' to follow movement of the shaft 16' under severe eccentricities. In the preferred form, the bearing member includes a cylindrical bearing liner 52 as shown, preferably of a polytetrafluoroethylene material. The latter material is preferred for its particularly low coefficient of friction.

It will be noted in reference to the presently described preferred embodiments that the dirt lip as described and shown comprises a line contact with the shaft, whereas the bearing member 50 comprises a surface contact with the shaft. It is conceivable, however, that there may be alternative designs which provide for line contact of the shaft by the bearing member and surface contact by the dirt lip. In addition, there may be embodiments wherein a plurality of dirt lips may be employed, or even a plurality of bearing members. All of such alternative embodiments, as well as numerous others, are envisioned to be covered by the following claims, to the extent that they may fall within the spirit and scope thereof.

What is claimed is:

1. In an annular shaft seal including a primary body portion having a continuous oil sealing lip radially disposed for sealing against oil flow between a bore and a shaft extending through said bore, said seal including a rigid case support disposed for engaging said bore, an annular flexible portion comprising a plurality of annuli, said annuli connecting said sealing element with said case support to provide for radial floating of said lip with respect to said shaft relative to the case support, said flexible portion and said oil sealing lip being integrally molded together to comprise a unitary, molded body of an elastomeric material; an improvement comprising said annuli defining a convoluted cross section, each adjoining pair of annuli comprising a reverse bend, wherein one of said reverse bends comprises a reinforcement annulus integrally molded into said reverse bend separately and apart from said case support, said reinforcement annulus formed of a less elastic material than that of said flexible portion.

2. The annular shaft seal of claim 1 further comprising an annular dirt lip adjacent said oil sealing lip, said dirt lip disposed angularly away from said oil sealing lip.

3. The annular shaft seal of claim 2 further comprising a bearing member having a low friction cylindrical surface adapted to engage said shaft under conditions of extreme shaft eccentricity.

4. The annular shaft seal of claim 3 wherein said bearing member is positioned axially intermediately of said oil sealing lip and said dirt lip along said shaft.

5. The annular shaft seal of claim 4 wherein said dirt lip is disposed for line contact with said shaft.

6. The annular shaft seal of claim 5 wherein said bearing member is disposed for surface contact with said shaft, said bearing member comprising a polytetrafluoroethylene liner.

7. The annular shaft seal of claim 6 wherein said convoluted cross section comprises four reverse bends, wherein said reinforcement annulus of said one of said reverse bends is contained in the third reverse bend from said primary body portion.

8. The annular shaft seal of claim 7 wherein each successive reverse bend from said primary body portion has a thickness less than that of the preceding reverse bend.

9. The annular shaft seal of claim 8 wherein said reinforcement annulus in said one of said reverse bends comprises a plastic material.

10. The annular shaft seal of claim 8 wherein said reinforcement annulus is of a metallic material.

11. The annular shaft seal of claim 1 wherein said reinforcement annulus comprises a circular cross-section.

12. The annular shaft seal of claim 11 wherein said rigid case support comprises a metallic material.

* * * * *